United States Patent
Lesko et al.

(10) Patent No.: US 6,713,552 B1
(45) Date of Patent: Mar. 30, 2004

(54) PRESSURE SENSITIVE ADHESIVE WITH IMPROVED PEEL STRENGTH AND TACK

(75) Inventors: Patricia Marie Lesko, Ottsville, PA (US); Robert M. Blankenship, Harleysville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 128 days.

(21) Appl. No.: 09/620,154

(22) Filed: Jul. 20, 2000

Related U.S. Application Data

(60) Provisional application No. 60/150,247, filed on Sep. 23, 1999.

(51) Int. Cl.[7] .............................................. C08L 39/06
(52) U.S. Cl. .................. 524/549; 524/555; 524/556; 524/558; 524/559; 524/560; 524/563; 524/564; 524/567; 524/568; 524/804; 524/808; 524/831; 524/832; 524/833; 526/204; 526/220
(58) Field of Search ................................ 524/556, 832, 524/549, 555, 558, 559, 560, 563, 564, 567, 568, 808, 831, 833, 804; 526/204, 220

(56) References Cited

U.S. PATENT DOCUMENTS

| | | | | |
|---|---|---|---|---|
| 3,488,338 A | * | 1/1970 | Bailey et al. ................. | 526/83 |
| 5,322,912 A | | 6/1994 | Georges et al. .............. | 526/204 |
| 5,412,047 A | | 5/1995 | Georges et al. .............. | 526/204 |
| 6,008,303 A | * | 12/1999 | Weingart et al. ......... | 525/330.7 |
| 6,218,468 B1 | * | 4/2001 | Mathauer et al. .............. | 525/88 |
| 6,353,065 B1 | * | 3/2002 | Charleux et al. ........... | 526/220 |

FOREIGN PATENT DOCUMENTS

| | | |
|---|---|---|
| DE | 196 32 203 A1 | 2/1998 |
| DE | 197 27 502 A1 | 1/1999 |
| DE | 197 27 505 A1 | 1/1999 |
| WO | WO 99/03894 | 1/1999 |

* cited by examiner

*Primary Examiner*—Judy M. Reddick
(74) *Attorney, Agent, or Firm*—Ronald D. Bakule

(57) ABSTRACT

An aqueous composition suitable for use when dry as a pressure sensitive adhesive including an aqueous emulsion polymer formed by the free radical polymerization of at least one ethylenically unsaturated monomer at a reaction temperature lower than 100° C. in the presence of 20–1500 ppm, based on the total weight of the monomer, of an N-oxyl radical, the polymer having a glass transition temperature (Tg) from −80° C. to 0° C. is provided. Also provided is a method for preparing the emulsion polymer and a method for coating a substrate with an aqueous composition to provide a pressure sensitive adhesive layer on a substrate.

4 Claims, No Drawings

PRESSURE SENSITIVE ADHESIVE WITH IMPROVED PEEL STRENGTH AND TACK

This patent application claims benefit of Provisional Application No. 60/150,247 filed Aug. 23, 1999.

This invention relates to an aqueous composition suitable for use when dry as a pressure sensitive adhesive having improved peel strength and tack, a method for preparing an aqueous emulsion polymer suitable for use in a pressure sensitive adhesive having improved peel strength and tack, and a method for coating a substrate with an aqueous coating composition to provide a pressure sensitive adhesive layer on the substrate, the adhesive layer having improved peel strength and tack. More particularly this invention relates to an aqueous composition suitable for use when dry as a pressure sensitive adhesive including an aqueous emulsion polymer formed by the free radical polymerization of at least one ethylenically unsaturated monomer at a reaction temperature lower than 100° C. in the presence of 20–1500 ppm, based on the total weight of the monomer, of an N-oxyl radical, the polymer having a glass transition temperature (Tg) from −80° C. to 0° C.

The present invention serves to provide an aqueous composition suitable for use when dry as a pressure sensitive adhesive, the adhesive being a permanently tacky film capable of adhering to a variety of substrates under slight pressure at ambient temperatures. Pressure sensitive adhesives are commonly applied to a substrate such as paper or a polymeric film, which construction may be used in the form of a label or tape having facile adhesion to a substrate of the same or different composition and form.

German Patent Application DE 197 27 502 discloses a method of radical-initiated aqueous emulsion polymerization in which monomers are polymerized in the presence of an N-oxyl radical by means of special radical polymerization initiators at temperatures above 100 C. and pressures above the vapor pressure of the polymerization mixture. The emulsion polymers are disclosed to be useful as binders for paints or leather finishes.

The problem faced by the inventors is the provision of an aqueous composition suitable for use when dry as a pressure sensitive adhesive having improved peel strength and tack. N-oxyl radicals are routinely used for inhibition of monomer and to enhance the storage stability of monomers and polymers. Unexpectedly, the inventors found that pressure sensitive adhesive polymers produced in the presence of low levels of N-oxyl radicals at conventional temperatures for emulsion polymerization, namely, lower than 100° C., provided a useful improvement in the peel strength and tack of pressure sensitive adhesives.

In a first aspect of the present invention there is provided an aqueous composition suitable for use when dry as a pressure sensitive adhesive including an aqueous emulsion polymer formed by the free radical polymerization of at least one ethylenically unsaturated monomer at a reaction temperature lower than 100° C. in the presence of 20–1500 ppm, based on the total weight of the monomer, of an N-oxyl radical, the polymer having a glass transition temperature (Tg) from −80° C. to 0 C°.

In a second aspect of the present invention there is provided a method for preparing an aqueous emulsion polymer suitable for use in an aqueous pressure sensitive adhesive composition including forming an aqueous emulsion polymer by the free radical polymerization of at least one ethylenically unsaturated monomer at a reaction temperature lower than 100° C. in the presence of 20–1500 ppm, based on the total weight of the monomer, of an N-oxyl radical, the polymer having a glass transition temperature (Tg) from −80° C. to 0° C.

In a third aspect of the present invention there is provided a method for coating a substrate with an aqueous composition to provide a pressure sensitive adhesive layer on a substrate comprising: forming the aqueous composition including an aqueous emulsion polymer formed by the free radical polymerization of at least one ethylenically unsaturated monomer at a reaction temperature lower than 100° C. in the presence of 20–1500 ppm, based on the total weight of the monomer, of an N-oxyl radical, the polymer having a glass transition temperature (Tg) from −80° C. to 0° C.; applying the aqueous composition to the substrate; and drying, or allowing to dry, the aqueous composition.

This invention relates to an aqueous composition suitable for use when dry as a pressure sensitive adhesive including an aqueous emulsion polymer formed by the free radical polymerization of at least one ethylenically unsaturated monomer at a reaction temperature lower than 100° C. in the presence of 20–1500 ppm, based on the total weight of the monomer, of an N-oxyl radical, the polymer having a glass transition temperature (Tg) from −80° C. to 0° C.

The aqueous emulsion polymer contains at least one copolymerized ethylenically unsaturated monomer such as, for example, a (meth)acrylic ester monomer including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, aminoalkyl (meth)acrylates; styrene or substituted styrenes; butadiene; vinyl acetate or other vinyl esters; vinyl monomers such as vinyl chloride, vinylidene chloride, N-vinyl pyrollidone; and acrylonitrile or methacrylonitrile. The use of the term "(meth)" followed by another term such as acrylate or acrylamide, as used throughout the disclosure, refers to both acrylates or acrylamides and methacrylates and methacrylamides, respectively.

The emulsion polymer may contain from 0% to 10%, by weight based on total monomer weight, of a copolymerized monoethylenically-unsaturated carboxylic acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, and maleic anhydride. Preferred is from 0.2% to 5%, by weight based on total monomer weight, acrylic acid, methacrylic acid, or itaconic acid.

The emulsion polymer used in this invention may contain from 0% to 1%, by weight based on monomer weight, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene. Preferred is from 0% to 0.1%, by weight based on monomer weight, copolymerized multi-ethylenically unsaturated monomer.

The glass transition temperature ("Tg") of the emulsion polymer is from −80° C. to 0° C., as measured by differential scanning calorimetry (DSC) taking the mid-point in the heat flow versus temperature transition as the Tg value, the monomers and amounts of the monomers being selected to achieve the desired Tg range as is well known in the art.

The polymerization techniques used to prepare aqueous emulsion-polymers are well known in the art. In the emulsion polymerization process conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of monomer. Either thermal or redox initiation processes may be used. The reaction temperature is maintained at a temperature lower than 100 C. throughout the course of the reaction. Preferred is a reaction temperature between 30 C. and 95 C., more preferably between 50 C. and 90 C. The monomer mixture may be added neat or as an emulsion in water. The monomer mixture may be added in one or more additions or continuously over the reaction period allotted in a linear fashion or not, whether coordinated with the addition of initiator or not. Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chain transfer agents such as mercaptans may be used to lower the molecular weight of the formed polymer; the use of no chain transfer agent is preferred.

The free radical polymerization of the monomer to polymer is carried out in the presence of 20–1500 ppm, preferably 50–1000 ppm, more preferably 250–1000 ppm, based on the weight of the monomer added, of a n-oxyl radical. N-oxyl radicals suitable for use in the emulsion polymerization are well-known in the art and include those disclosed, for example, in EP 135,280, DE 19,651,307, U.S. Pat. Nos. 5,322,912, 4,581,429, 5,412,047, and DE 19,727, 502. Examples of suitable N-oxyl radicals include 2,2,6,6-tetramethylpiperidin-1-oxyl; 4-hydroxy-2,2,6,6-tetramethylpiperidin-1-oxyl, 4-hydroxy-2,6-diphenyl-2,6-dimethylpiperidin-1-oxyl; 4-carboxy-2,2,6,6-tetramethylpiperidin-1-oxyl; 4-carboxy2,6-diphenyl-2,6-dimethylpiperidin-1-oxyl; 3-carboxy-2,2,5,5-tetramethylpyrrolidin-1-oxyl; 3-carboxy-2,5-diphenyl-2,5-dimethylpyrrolidin-1-oxyl; and sodium or potassium salts of the sulfuric acid monoester of 4-hydroxy-2,2,6,6-tetramethylpiperidin-1-oxyl. Some N-oxyl radicals are soluble in water or soluble in water with adjustment of pH; others may be dissolved in the monomer used in the polymerization reaction.

The average particle diameter of the emulsion-polymerized polymer particles is preferred to be from 30 nanometers to 500 nanometers, as measured by a BI-90 Particle Sizer.

The aqueous coating composition may contain, in addition to the emulsion polymer, conventional adjuvants such as, for example, tackifiers, pigments, emulsifiers, coalescing agents, buffers, neutralizers, thickeners or rheology modifiers, humectants, wetting agents, biocides, plasticizers, antifoaming agents, colorants, waxes, and anti-oxidants.

The solids content of the aqueous coating composition may be from 15% to 80% by weight, preferably from 45% to 75% by weight. The viscosity of the aqueous composition may be from 0.05 to 10 Pa.s (50 cps to 10,000 cps), preferably from 0.2 to 3 Pa s (200–3000 cps), as measured using a Brookfield viscometer; the viscosities appropriate for different application methods vary considerably.

The aqueous coating composition may be applied to a substrate such as, for example, tape or label stock, for example, paper or polymer film such as polypropylene, polyvinyl chloride, polyethylene terephthalate, metal, or the like, with or without a prior substrate treatment such as an acid etch or corona discharge or primer using conventional adhesives application methods such as, for example, roll coating, doctor-blade application, and printing methods.

The aqueous composition coated on the substrate is typically dried, or allowed to dry, at a temperature from 20° C. to 95° C.

The following examples are presented to illustrate the invention and the results obtained by the test procedures.

Abbreviations

AA=acrylic acid

BA=butyl acrylate

EHA=2-ethylhexyl acrylate

MA=methyl acrylate

NaOH=sodium hydroxide

NaPS=sodium persulfate

TEMPO=2,2,6,6-tetramethyl-1-piperidinyloxy, free radical (N-oxyl radical), from Aldrich Chemical 4-hydroxy TEMPO=4-hydroxy-2,2,6,6-tetramethyl-1-piperidinyloxy, free radical (N-oxyl radical), from Aldrich Chemical

COMPARATIVE EXAMPLE A

Aqueous Emulsion Polymer of 58 BA/25 EHA/ 16.5 MA/0.5 AA Prepared in the Absence of N-oxyl Radicals The polymerization was carried out in a 3 liter, four-neck, round bottom glass flask equipped with a mechanical blade stirrer, a thermocouple to monitor temperature, a reflux condenser, a means to heat and cool, and a nitrogen atmosphere. The flask was charged with 328 g deionized water and 0.75 g ascorbic acid and heated to 85° C. A monomer pre-emulsion was prepared from 340 g deionized water, 60 g of a 30% aqueous solution of the sodium salt of the sulfuric acid half ester of nonylphenol ethoxylated with 30 ethylene oxide units, 7.5 g of a 50% aqueous solution of NaOH, 7.5 g AA, 247.5 g MA, 870 g BA and 375 g EHA. The reaction flask was charged with 0.6 g of NaPS in 8 g deionized water. After 5 minutes a solution of 5.4 g NaPS in 72 g deionized water was started and added at a constant rate over 210 minutes. Simultaneously with the NaPS feed, the monomer pre-emulsion feed was started at 2.1 cc per minute. After 10 minutes the monomer pre-emulsion feed was increased to 4.1 cc per minute. After another 10 minutes the monomer pre-emulsion feed rate was increased to 6.2 cc per minute, and after another 10 minutes the monomer pre-emulsion feed was increased to 10.9 cc per minute and then fed at this rate for 180 minutes. Heating and cooling were applied as necessary to maintain the reaction temperature at 85° C. After the monomer pre-emulsion was added, the temperature was held at 85° C. for 15 minutes, then the reaction mixture was cooled to 65° C. A solution of 0.008 g of FeSO4.7 H20 in 5 g deionized water was added, followed by 2.5 g of tert-butyl hydroperoxide and 1.3 g ascorbic acid dissolved in a total of 60 g of deionized water. The reaction mixture was cooled to room temperature and filtered. An aqueous emulsion polymer with solids content of 62.8%, pH of 6.2 and monomer conversion greater than 99.94% was obtained.

Example 1

Preparation of Aqueous Emulsion Polymer

The procedure as in Comparative Example A was followed with the difference that the monomers contained 200 ppm (0.3 g) of TEMPO (actives based on total monomer weight). A polymer latex with solids content of 60.3%, pH of 6.4 and monomer conversion of greater than 99.94% was obtained.

Example 2

Preparation of Aqueous Emulsion Polymer

The procedure as in Comparative Example A was followed with the difference that the monomers contained 500 ppm (0.75 g) of TEMPO (actives based on total monomer weight). A polymer latex with solids content of 61.8%, pH of 6.0 and monomer conversion of greater than 99.94% was obtained.

Example 3

Preparation of Aqueous Emulsion Polymer

The procedure as in Comparative Example A was followed with the difference that the monomers contained 1000 ppm (1.5 g) of TEMPO (actives based on total monomer weight).

Example 4

Preparation of Aqueous Emulsion Polymer

The procedure as in Comparative Example A was followed with the difference that the monomers in the pre-emulsion contained 200 ppm (6.0 g of a 5 wt % aqueous solution) of 4-hydroxy-TEMPO (actives based on total monomer weight).

Example 5

Preparation of Aqueous Emulsion Polymer

The procedure as in Comparative Example A was followed with the difference that the monomers in the pre-emulsion contained 500 ppm (15.0 g of a 5 wt % aqueous solution) of 4-hydroxy-TEMPO (actives based on total monomer weight).

Example 6

Preparation of Aqueous Emulsion Polymer

The procedure as in Comparative Example A was followed with the difference that the monomers in the pre-emulsion contained 1000 ppm (30.0 g of a 5 wt % aqueous solution) of 4-hydroxy-TEMPO (actives based on total monomer weight).

Example 7

Evaluation of Aqueous Emulsion Polymers as Pressure Sensitive Adhesives

OPP (oriented polypropylene) tape 0.0033 cm (1.3 mils) thick was coated with aqueous emulsion polymer to provide a dry coat weight of 23 g/m². The test methods used were: TLMI (Tag and Label Manufacturers Institute) test L-IA1—180° Peel Adhesion—20 minute dwell Peel; ASTM (American Society for Testing Materials) D6195—Loop Tack; and PSTC (Pressure Sensitive Tape Council) #7—Holding Power of PS tapes—for shear strength using 1.27 cm (½ in)×1.27 cm (½ in) or 2.54 cm (1 in)×2.54 cm (1 in) overlap and a 1 kg weight, with the variation that our tests were done with stainless steel (SS) substrate instead of fiberboard.

TABLE 7.1

Evaluation of pressure sensitive adhesive properties

| | PEEL,SS | LOOP TACK,SS | SHEAR,SS ½ × 1 × 1 KG | SHEAR,SS 1 × 1 × 1 KG |
|---|---|---|---|---|
| Comparative A | 21A | 43.1A | 8.9 H C/AFB | >326 HRS |
| Example 1 | 20A | 41.5A | 1.7 H-C/AFB | 29.2 H-C/AFB |
| Example 2 | 26A | 51.8A | 7.8 H-AFB/SL.C | >326 HRS |
| Example 3 | 25A | 48.3A | 5.5 H-C/AFB | 130.5 H-C/AFB |
| Example 4 | 22A | 43.6A | 5.0 H-C/AFB | >326 HRS |
| Example 5 | 23A | 51.4A | 7.7 H-C/AFB | 277.6 H C/AFB |
| Example 6 | 26A | 52.9A | 12.8 H-C/AFB | 1 @ 315 HRS |

A = adhesive; C = cohesive; AFB = adhesive failure from backing

Examples 2–6 of the present invention exhibit superior peel strength and tack at similar shear strength when compared with Comparative Sample 1.

Example 1 is approximately equal in peel strength and tack properties to Comparative Sample A.

What is claimed is:

1. An aqueous composition suitable for use when dry as a pressure sensitive adhesive comprising an aqueous emulsion polymer formed by the free radical polymerization of at least one ethylenically unsaturated monomer selected from the group consisting of (meth)acrylic ester monomers, vinyl esters, vinyl chloride, vinylidene chloride, N-vinyl pyrollidone, and (meth)acrylamides, from 0% to 10%, by weight based on total monomer weight, of a monoethylenically-unsaturated carboxylic acid monomer, and from 0% to 1%, by weight based on monomer weight, multi-ethylenically unsaturated monomer selected from the group consisting of allyl methacrylate, diallyl phthalate, 1,4-butylene glycol dimethacrylate, 1,2-ethylene glycol dimethacrylate, and 1,6-hexanediol diacrylate at a reaction temperature lower than 100° C. in the presence of 20–1500 ppm, based on the total weight of said monomer, of an N-oxyl radical, said polymer having a glass transition temperature (Tg) from −80° C. to 0° C.

2. The aqueous composition of claim 1 wherein the level of N-oxyl radical is 250–1000 ppm, based on the total weight of said monomer.

3. A method for preparing an aqueous emulsion polymer suitable for use in an aqueous pressure sensitive adhesive composition comprising:

forming said aqueous emulsion polymer by the free radical polymerization of at least one ethylenically unsaturated monomer selected from the group consisting of (meth)acrylic ester monomers, vinyl esters, vinyl chloride, vinylidene chloride, N-vinyl pyrollidone, and (meth)acrylamides, from 0% to 10%, by weight based on total monomer weight, of a monoethylenically-unsaturated carboxylic acid monomer, and from 0% to 1%, by weight based on monomer weight, multi-ethylenically unsaturated monomer selected from the group consisting of allyl methacrylate, diallyl phthalate, 1,4-butylene glycol dimethacrylate, 1,2-ethylene glycol dimethacrylate, and 1,6-hexanediol diacrylate at a reaction temperature lower than 100° C. in the presence of 20–1500 ppm, based on the total weight of said monomer, of an N-oxyl radical, said polymer having a glass transition temperature (Tg) from −80° C. to 0° C.

4. The method of claim 3 wherein the level of N-oxyl radical is 250–1000 ppm, based on the total weight of said monomer.

* * * * *